(No Model.)

F. K. IRVING.
SECONDARY BATTERY.

No. 512,473. Patented Jan. 9, 1894.

Witnesses:
D. H. Hayward
Fred Haynes

Inventor:
Frank K. Irving
by attorneys
Brown & Seward

UNITED STATES PATENT OFFICE.

FRANK K. IRVING, OF NEW YORK, N. Y., ASSIGNOR TO THE FRANKLIN ELECTRIC COMPANY, OF SAME PLACE.

SECONDARY BATTERY.

SPECIFICATION forming part of Letters Patent No. 512,473, dated January 9, 1894.

Application filed September 13, 1892. Serial No. 445,762. (No model.)

*To all whom it may concern:*

Be it known that I, FRANK K. IRVING, of the city and county of New York, in the State of New York, have invented a new and useful Improvement in Secondary Batteries, of which the following is a specification.

My invention relates to an improvement in accumulators or secondary batteries with a view of avoiding all danger of buckling and the flowing of active material out of grids and at the same time rendering the battery capable of being charged and discharged at any rate desirable without injurious effects and to materially lighten the weight of the battery relative to its power.

Figure 1:
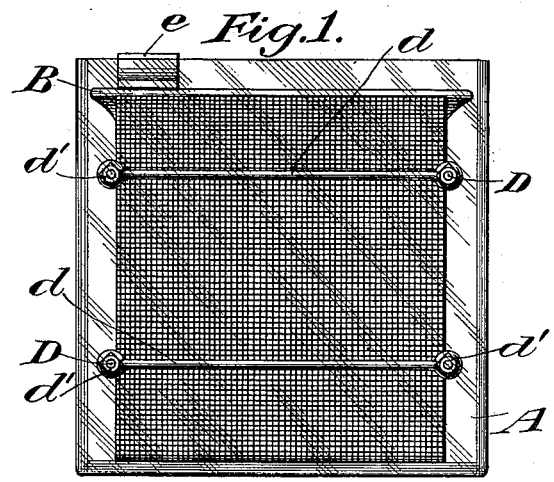
Figure 2:
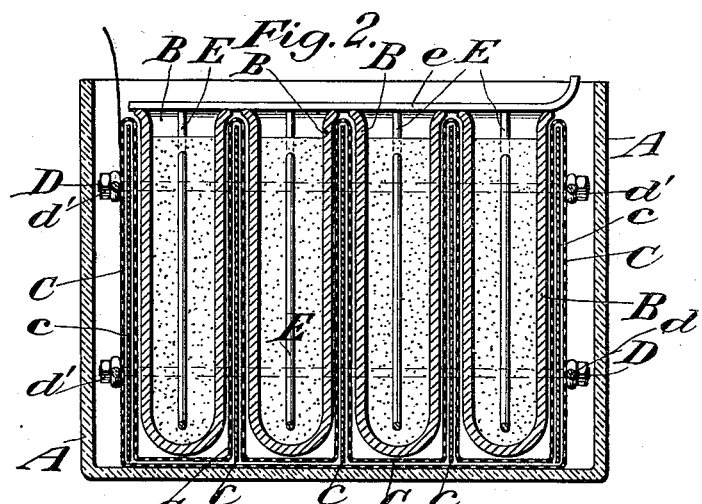
Figure 3:
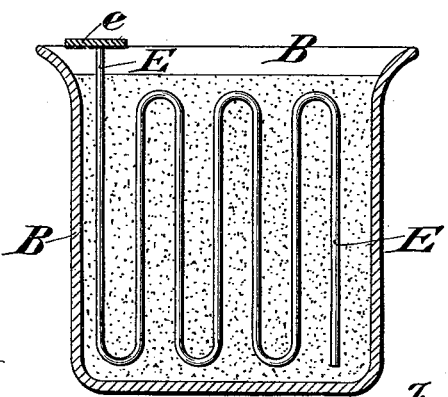

In the accompanying drawings Figure 1 is a view of the battery in end elevation. Fig. 2 is a view in vertical longitudinal section and Fig. 3 is a view in detail taken in vertical section through one of the porous cups in the direction of its greatest diameter.

A represents an ordinary glass cell of such size and shape as may be required to hold the assembled elements. In the present instance I have shown it as of oblong rectangular form.

Within the glass cell A there is located a series of porous cups B, arranged in the present instance transversely across the cell A and inserted in pockets provided for them by a specially constructed negative element C as follows: The negative element C consists of a continuous piece of copper gauze extending from the upper portion of one of the cups B at one end of the cell A down the end to the bottom, thence to the opposite end of the cell A, thence upwardly to a point near the top of the cup B at that end and thence turned back upon itself and extended down into proximity to the bottom of the cell underneath the cup B, thence up and down between two successive cups B and under the next succeeding cup and so on back to its point of beginning. The effect is to produce a series of pockets extending transversely across the cell A and separated from each other by a double thickness of the wire gauze. Between the folds of the wire gauze at the ends of the cell and between the porous cups B, are inserted zinc plates c. The negative element folded into the form of pockets and the series of porous cups B inserted within the pockets are held in assembled adjustment by means of rods D having screw-threaded ends and adapted to extend along the ends of the series of porous cups and on opposite sides of the group, the said rods being connected at their opposite ends by cross rods $d$ preferably formed as shown in Fig. 1, with eyes adapted to embrace the rods D, the said cross rods and longitudinal rods D being bound together and tightly clamped to the group of cups around the exterior of the folded negative element by means of nuts $d'$ screwed on to the opposite ends of the said longitudinal rods outside of the cross rods.

The number of binding rods as just described may be one or more at pleasure. In the accompanying drawings I have shown two sets and this number I find sufficient for the larger sizes of batteries while for smaller sized batteries a single set is found sufficient.

Within the porous cups B, I insert the positive element consisting in the present instance of a lead wire E containing about two per cent. of silver and arranged in open folds as clearly indicated in Fig. 3. The ends of the wires E in the several cups are united by a good electric conductor $e$ extending transversely across the series of cups B from end to end of the cell A.

The porous cups are supplied with a depolarizing substance employed in the present instance in the form of a paste, into which the positive elements E may be inserted. The composition which I find it desirable to employ for this purpose consists of peroxide of lead mixed with sulphate of aluminium, a composition for which I have made application for Letters Patent, filed May 16, 1891, renewed August 12, 1892, and again renewed March 10, 1893, Serial No. 465,435.

To complete the battery for use, the group of porous cups with their contents and the negative elements surrounding them are immersed in a solution of mercury contained in the glass cell A; sulphate of ammonia and acid bi-sulphate of mercury in solution may be employed. The battery as thus set up is in effect a secondary battery with a primary action.

In charging, the positive element is oxidized and amalgam deposited on the negative, and on discharging the negative is oxidized and hydrogen deposited on the positive. The zinc plates furnish the zinc for the amalgamation of the copper gauze and it is ascertained that not only is the copper gauze a lighter and more enduring form of negative, but it at the same time, prevents the zinc plates inserted between its folds from what is commonly known as feathering, viz., the formation of feather-like tongues of deposit which tend to short circuit the elements.

What I claim is—

1. The negative element for a galvanic battery consisting of a continuous perforated strip of copper arranged in folds at intervals from one another and extended underneath the open ends of the folds forming pockets inclosed at the top, bottom and sides, and sheets of zinc inserted in the pockets formed by the folds, substantially as set forth.

2. The combination with one or more porous cups containing an element of one polarity, of a sheet of gauze arranged along the bottom and sides of the porous cup or cups and forming a battery element of the opposite polarity from that within the porous cup or cups, substantially as set forth.

3. The combination with a series of porous cups containing the positive elements of a battery, of copper gauze arranged in folds about the bottoms and sides of the porous cups and provided with sheets of zinc in the folds to form the negative element of a battery, substantially as set forth.

4. The gauze plate folded to form pockets, the porous cups within the pockets and the binding rods surrounding the gauze elements and porous cups to hold the elements in a group, substantially as set forth.

5. The battery cell comprising the copper gauze folded to form pockets, sheets of zinc in its folds, porous cups in the pockets, a lead element in the cups, a depolarizer in the cups around the lead and a solution of mercury surrounding the gauze and cups, substantially as set forth.

FRANK K. IRVING.

Witnesses:
FREDK. HAYNES,
GEORGE BARRY.